US012579427B2

(12) United States Patent
Zhao et al.

(10) Patent No.: US 12,579,427 B2
(45) Date of Patent: Mar. 17, 2026

(54) EMBEDDING OPTIMIZATION FOR MACHINE LEARNING MODELS

(71) Applicant: Microsoft Technology Licensing, LLC, Redmond, WA (US)

(72) Inventors: Xiangyu Zhao, Hong Kong (CN); Sida Wang, Cupertino, CA (US); Huiji Gao, Sunnyvale, CA (US); Bo Long, Palo Alto, CA (US); Bee-Chung Chen, San Jose, CA (US); Weiwei Guo, Foster City, CA (US); Jun Shi, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1028 days.

(21) Appl. No.: 17/505,519

(22) Filed: Oct. 19, 2021

(65) Prior Publication Data

US 2023/0124258 A1 Apr. 20, 2023

(51) Int. Cl.
*G06N 3/08* (2023.01)
*G06F 5/01* (2006.01)

(52) U.S. Cl.
CPC ................. *G06N 3/08* (2013.01); *G06F 5/01* (2013.01)

(58) Field of Classification Search
None
See application file for complete search history.

(56) References Cited

U.S. PATENT DOCUMENTS

2019/0073580 A1* 3/2019 Dzhulgakov ........... G06N 3/045
2019/0073590 A1* 3/2019 Wu ......................... G06N 3/045
2019/0325293 A1* 10/2019 Wang ................. G06F 16/2246

OTHER PUBLICATIONS

"AvgPool," PyTorch 2.0 documentation (Year: 2021).*
"Adaptive Input Representations for Neural Language Modeling," Baevski et al; Baevski, arXiv, 2019 (Year: 2019).*
Liu, et al., "DeText: A Deep Neural Text Understanding Framework", Retrieved from: https://github.com/linkedin/detext, Aug. 26, 2020, 7 Pages.
Zhao, et al., "Memory-efficient Embedding for Recommendations", Retrieved from: https://arxiv.org/pdf/2006.14827.pdf, Oct. 21, 2020, 12 Pages.

* cited by examiner

*Primary Examiner* — Michael J Huntley
*Assistant Examiner* — Paul J Breene
(74) *Attorney, Agent, or Firm* — Cantor Colburn LLP; Renee D. Brown

(57) ABSTRACT

Methods, systems, and computer programs are presented for determining parameters of neural networks and selecting embedding dimensions for the feature fields. One method includes an operation for initializing parameters of a neural network and weights for embedding sizes for each feature associated with the neural network. The parameters of the neural network and the weights are iteratively optimized. Each optimization iteration comprises training the neural network with current parameters of the neural network to optimize a value of the weights, and training the neural network with current values of the weights to optimize the parameters of the neural network. Further, the method includes operations for selecting embedding sizes for the features based on the optimized values of the weights, and for training the neural network based on the selected embedding sizes for the features to obtain an estimator model. A prediction is generated utilizing the estimator model.

20 Claims, 12 Drawing Sheets

202 ~ OUTPUT LAYER

204 ~ MLP COMPONENT

206 ~ EMBEDDING COMPONENT

208 ~ FEATURE FIELDS

FIELD 1     FIELD M     FIELD M

210 ~ INPUT FEATURES

USER     ITEM     CONTEXT     INTERACTION

700

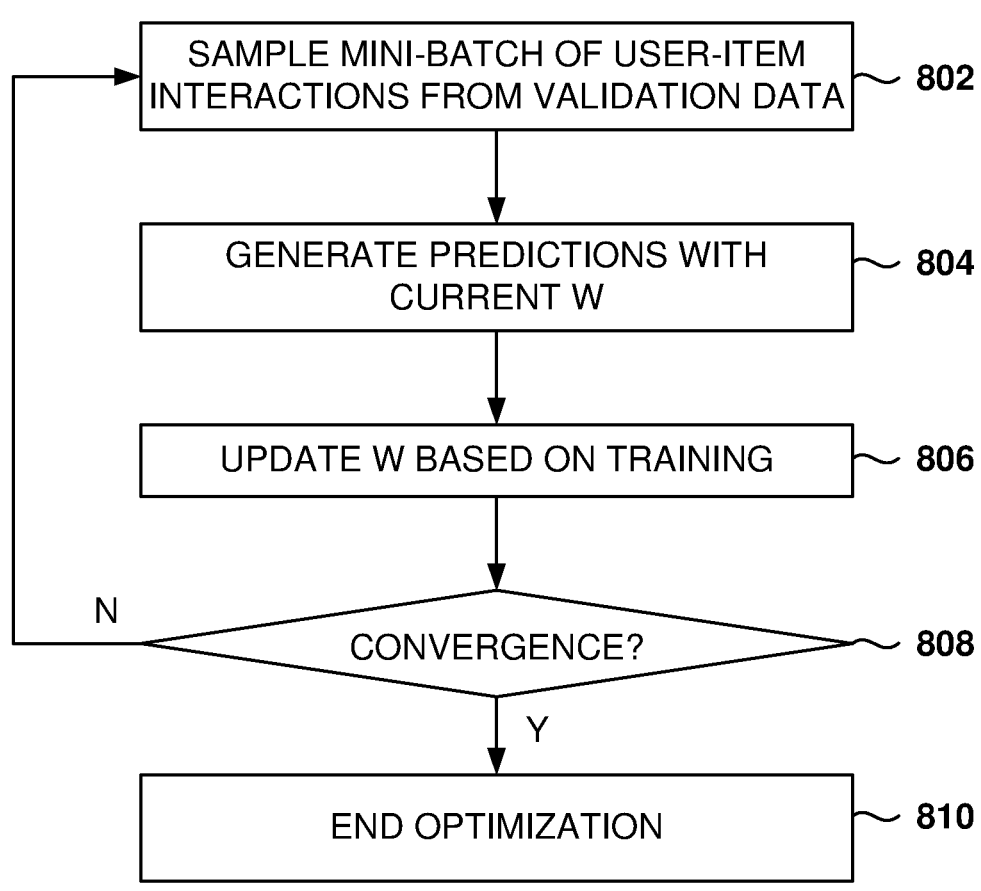
FIG. 8

1100

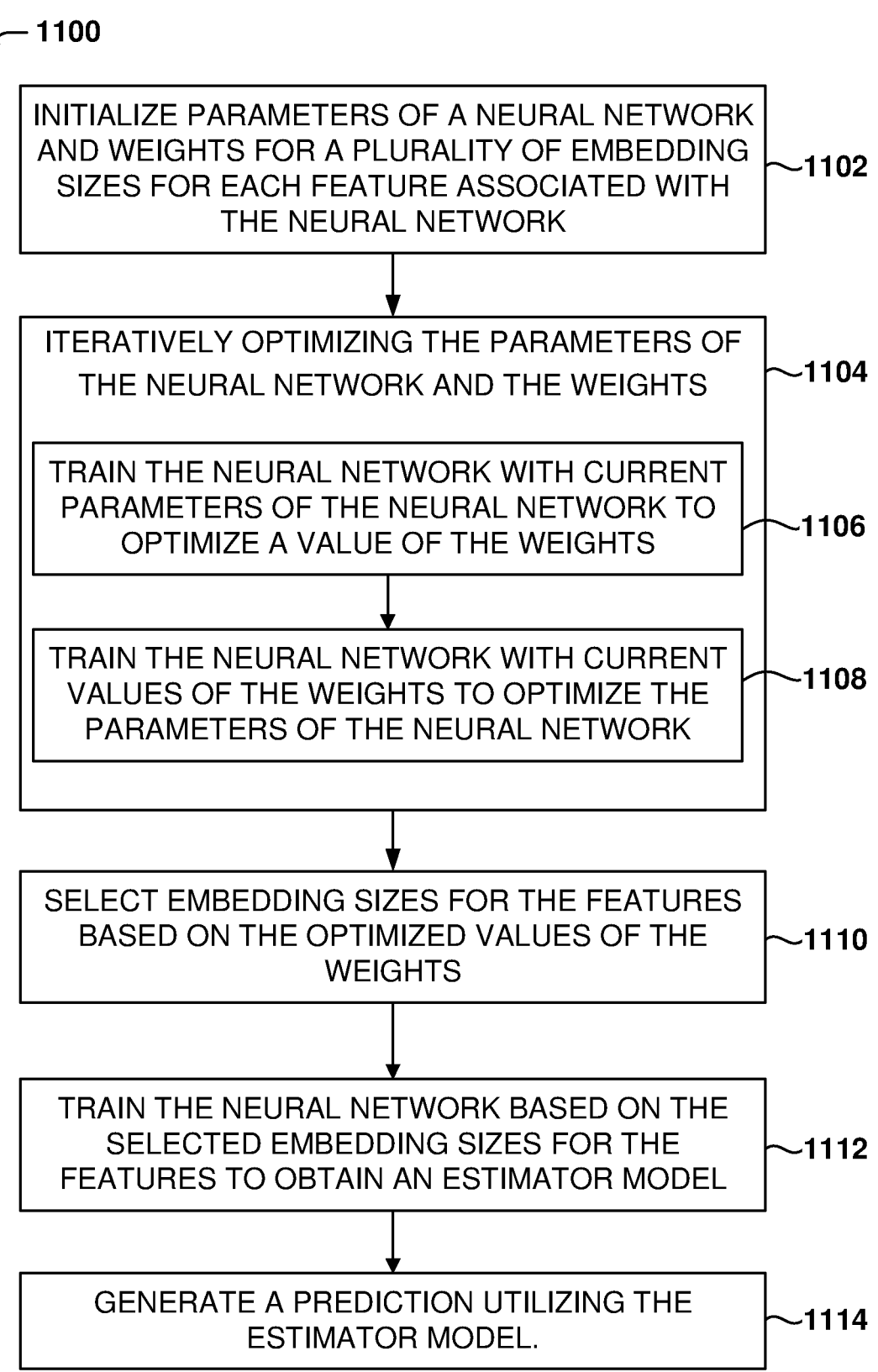

INITIALIZE PARAMETERS OF A NEURAL NETWORK AND WEIGHTS FOR A PLURALITY OF EMBEDDING SIZES FOR EACH FEATURE ASSOCIATED WITH THE NEURAL NETWORK — 1102

ITERATIVELY OPTIMIZING THE PARAMETERS OF THE NEURAL NETWORK AND THE WEIGHTS — 1104

TRAIN THE NEURAL NETWORK WITH CURRENT PARAMETERS OF THE NEURAL NETWORK TO OPTIMIZE A VALUE OF THE WEIGHTS — 1106

TRAIN THE NEURAL NETWORK WITH CURRENT VALUES OF THE WEIGHTS TO OPTIMIZE THE PARAMETERS OF THE NEURAL NETWORK — 1108

SELECT EMBEDDING SIZES FOR THE FEATURES BASED ON THE OPTIMIZED VALUES OF THE WEIGHTS — 1110

TRAIN THE NEURAL NETWORK BASED ON THE SELECTED EMBEDDING SIZES FOR THE FEATURES TO OBTAIN AN ESTIMATOR MODEL — 1112

GENERATE A PREDICTION UTILIZING THE ESTIMATOR MODEL. — 1114

FIG. 11

EMBEDDING OPTIMIZATION FOR MACHINE LEARNING MODELS

TECHNICAL FIELD

The subject matter disclosed herein generally relates to methods, systems, and machine-readable storage media for determining the structure of machine-learning embeddings and models.

BACKGROUND

The explosive growth of the worldwide web has generated large amounts of data, which has created an increasingly information overload problem that may overwhelm users searching for particular information. Recommender systems can mitigate the information overload problem by suggesting personalized items that best match users' preferences.

In recent years, the development of deep-learning based recommender systems (DLRS), which outperform traditional recommendation techniques (e.g., collaborative filtering and learning-to-rank), have grown in popularity because of their strong capability of feature representation and deep inference.

BRIEF DESCRIPTION OF THE DRAWINGS

Various of the appended drawings merely illustrate example embodiments of the present disclosure and cannot be considered as limiting its scope.

FIG. 8 is a flowchart of a method for optimization the DLRS after embedding sizes are determined, according to some example embodiments.

FIG. 11 is flowchart of a method for determining parameters of neural networks and selecting embedding dimensions for the feature fields, according to some example embodiments.

DETAILED DESCRIPTION

Figure 1:
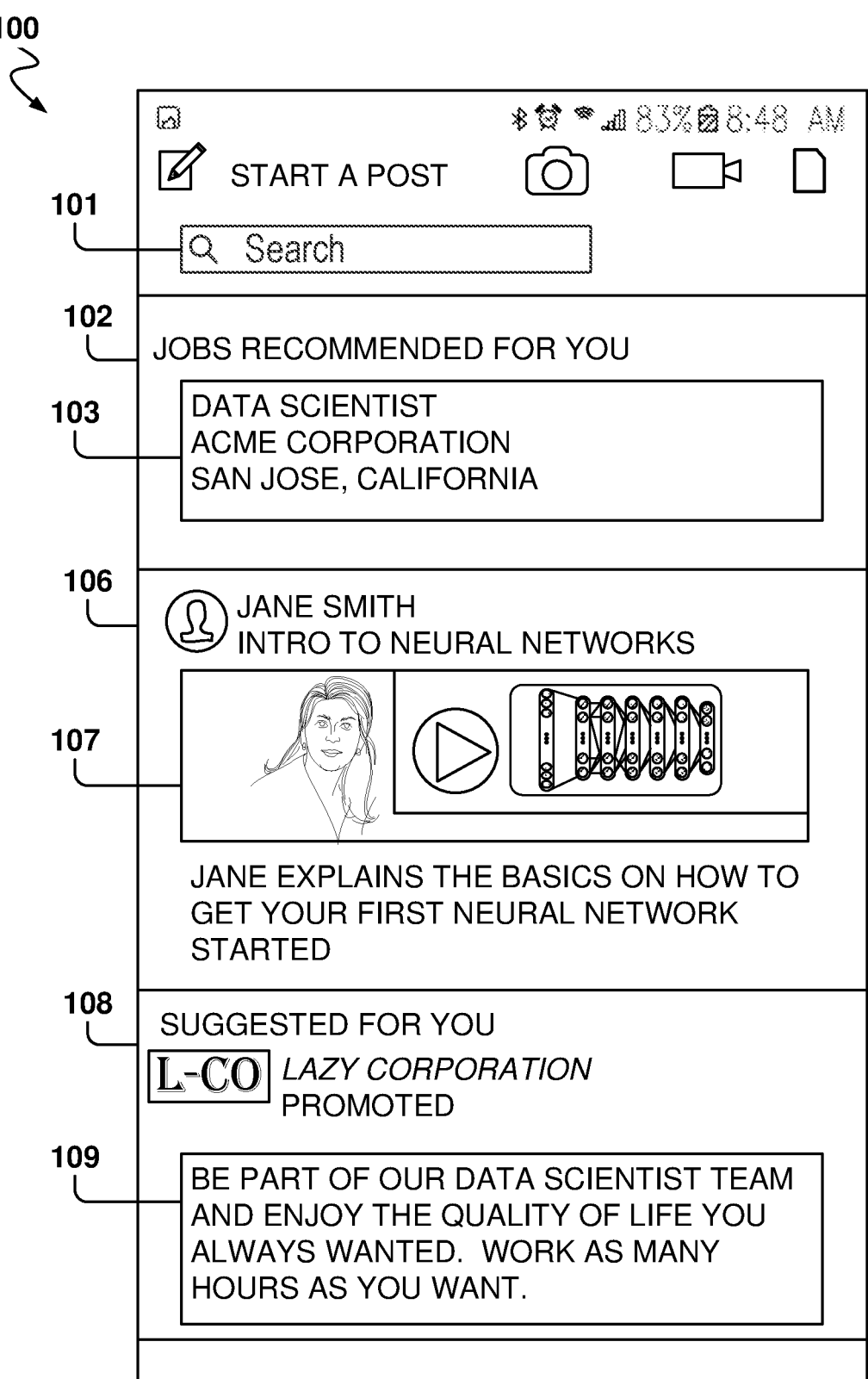
FIG. 1 is a screenshot of a user feed, according to some example embodiments.

Example methods, systems, and computer programs are directed to determining parameters of neural networks and selecting embedding dimensions for the feature fields. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

DLRS usually contain thousands of feature fields with information about users, results, performance history, contextual information, etc. The DLRS encodes each feature in a vector, which is referred to as the embedding of the feature. Typical recommender systems allocate the same dimension to the embeddings of the feature fields, although some feature fields provide more information than others. For example, a gender feature has two possible values (male and female), while an item ID feature in a shopping service or video-serving website may include millions of unique values. Thus, embedding the gender feature in a vector of the same dimension as the item ID feature results in a large waste of resources, such as the memory to store the embeddings and the computing resources required to process the embeddings during the training of a machine-learning (ML) program to create the DLRS model.

To address this problem, embodiments presented assign different embedding dimensions to different feature fields but selecting the optimal vector dimension for the embedding of a feature is difficult because there may be thousands or millions of features and the user may not know which fields should have small or large sizes. Further, selecting the wrong dimension for the embedding may be problematic, as an embedding that is too small will lose valuable information on the feature field, and an embedding that is too big will still waste computing resources. Due to the large amounts of feature fields and the nuanced relationship between embedding dimensions with feature distributions and neural network architectures, manually allocating embedding dimensions in practical recommender systems may result in poor performance gains, far from the optimal solution for each of the feature fields.

One aspect includes a framework to automatically select dimensions for the embeddings of feature fields in a data-driven fashion. An end-to-end differentiable framework calculates weights for multiple embedding sizes of feature fields over various dimensions while optimizing parameters of the neural network. Further, a discrete embedding component architecture is determined based on the maximal calculated weights, and then the recommender network is retrained with the determined discrete embedding component architecture.

One general aspect includes a method that includes an operation for determining parameters of neural networks. One method includes an operation for initializing parameters of a neural network and weights for embedding sizes for each feature associated with the neural network. The parameters of the neural network and the weights are iteratively optimized. Each optimization iteration comprises training the neural network with current parameters of the neural network to optimize a value of the weights, and training the neural network with current values of the weights to optimize the parameters of the neural network. Further, the method includes operations for selecting embedding sizes for the features based on the optimized values of the weights, and for training the neural network based on the selected embedding sizes for the features to obtain an estimator model. A prediction is generated utilizing the estimator model For the purposes of this description the phrases "an online social networking application," "an online social network system," and "an online social network service" may be referred to as and used interchangeably with the phrase "an online social network" or merely "a social network." It will also be noted that an online social network may be any type of an online social network, such as, e.g., a professional network, an interest-based network, or any online networking system that permits users to join as registered members. For the purposes of this description, registered members of an online social network may be referred to as simply members. Further, some online services provide services to their members (e.g., search for jobs, search for candidates for jobs, job postings) without being a social network, and the principles presented herein may also be applied to these online services.

FIG. 1 is a screenshot of a user feed 100 that includes items in different categories, according to some example embodiments. In the example embodiment of FIG. 1, the user feed 100 includes different categories, such as job recommendations 102, user posts 106, and sponsored items 108; other embodiments may include additional categories such as news, messages, articles, etc.

The user posts 106 include item 107 posted by users of the social network service (e.g., items posted by connections of the user), and may be videos, comments made on the social network, pointers to interesting articles or webpages, etc. In the illustrated example, the item 107 includes a video submitted by a user.

In one example embodiment, a social network service user interface provides the job recommendations 102 (e.g., job posts 103 and 109) that match the job interests of the user and that are presented without a specific job search request from the user, referred to herein as "jobs you may be interested in" (JYMBII). In other example embodiments, the user feed 100 includes suggestions or recommendations (not shown) for adding new connections, a feature referred to herein as People You May Know (PYMK).

Although the categories are shown as separated within the user feed 100, the items from the different categories may be intermixed, and not just presented as a block. Thus, the user feed 100 may include a large number of items from each of the categories, and the social network decides the order in which these items are presented to the user based on the desired utilities. Additionally, the user may receive in-network communications from other users. The communications may originate by other users who are socially connected with the user or by unconnected users.

Embodiments presented described methods for improving neural networks in general, and recommender systems as one example. Some embodiments are presented with reference to making recommendations on the social network service, but the same principles may be used for any type of recommendation, such as PYMK, job search, JYMBII, user posts, news, etc.

Figure 2:
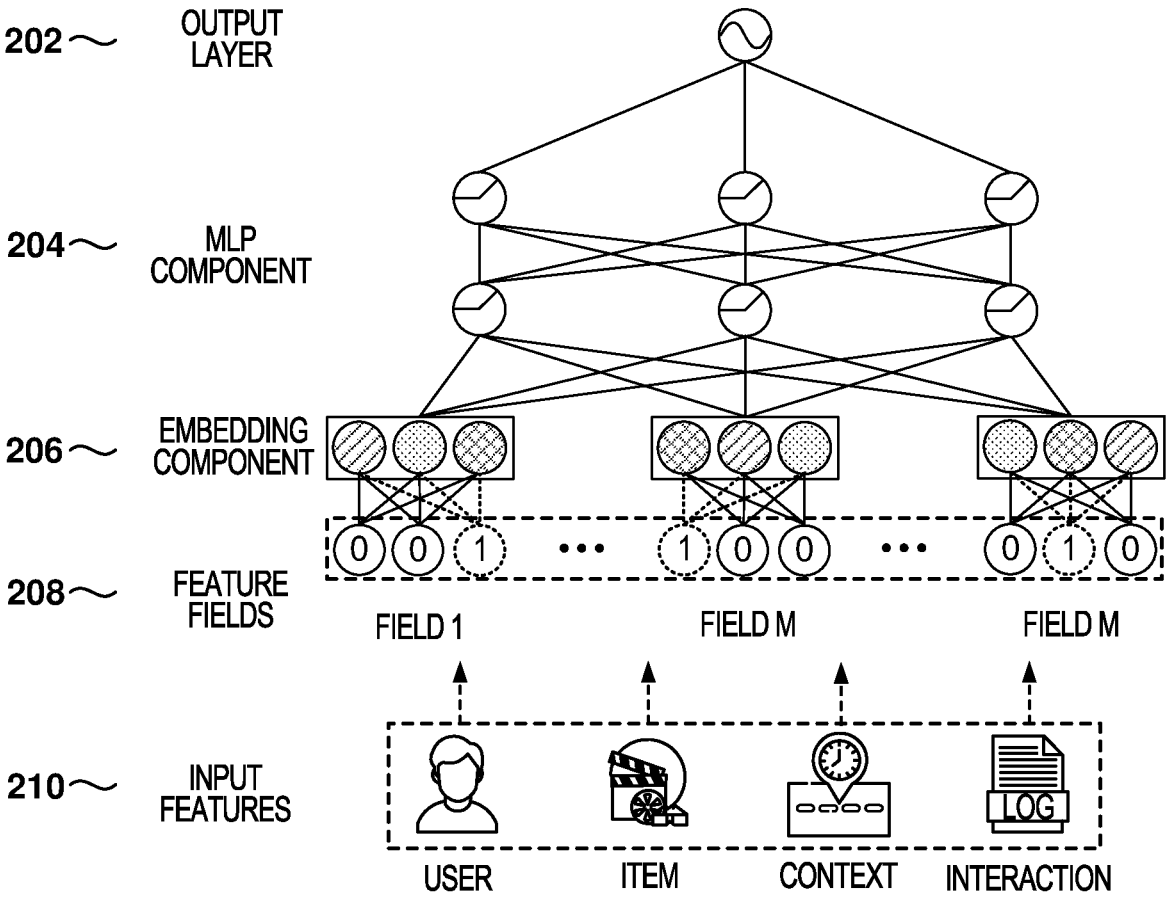
FIG. 2 is a sample Deep-Learning Recommender System (DLRS), according to some example embodiments.

FIG. 2 is a sample DLRS, according to some example embodiments. Real-world recommender systems typically involve a massive amount of categorical feature fields 208 derived from input features 210, such as users (e.g., occupation, user identifier (ID)), items (e.g., category, item ID), contextual information (e.g., time, location), and interactions (e.g., user's purchase history of items).

DLRSs map these categorical features into dense vectors of real numbers via an embedding-component 206, e.g., an embedding-lookup process, which leads to a large number of embedding parameters. For instance, the YouTube recommender system consists of 1 million unique video IDs and assigns each video ID with a specific 256-dimensional embedding vector, that is, the video ID feature field alone occupies 256 million parameters.

The DLRS is the Multi-Layer Perception (MLP) component 204 that transforms the embedding component 206 input embeddings from the feature fields 208 to generate the outputs, also referred to as predictions, referred to as the output layer 202. Typically, the MLP-component 204 involves several connected layers of a neural network. Therefore, compared to the MLP-component, the embedding-component dominates the number of parameters in practical recommender systems because of the large amount of memory required to store and process the embedding when compared to the small amount of memory required to store the MLP. Thus, the embedding component plays a tremendous impact role in the recommendation architecture based on computing-resources required to handle. As used herein, parameters of the DLRS refer to the structure of the MLP component 204 and the embedding component 206 refers to the embeddings of the feature fields 208. Although the embedding component may be considered part of the structure of the DLRS, for description purposes, the embedding component is not considered part of the parameters of the MLP component unless otherwise indicated.

The majority of existing recommender systems assign a fixed and unified embedding dimension for all feature fields 208, such as the Wide&Deep model, and this embedding scheme may lead to memory inefficiency. The embedding dimension often determines the capacity to encode information. Thus, allocating the same dimension to all feature fields may lose the information of high predictive features while wasting memory on non-predictive features. As mentioned above, embedding a gender feature may require one value, which means an embedding dimension of one is enough. Any embedding with a size greater than one would be wasting resources. On the other hand, highly informative features like the item ID on a shopping website provides a highly informative value since there may be millions of items. If the item ID is embedded in a vector that cannot accommodate all the possible values, the embedding will be too small, and the item ID feature will lose informational value.

In some embodiments, the DLRS is built by assigning a greater dimension for the embeddings of high informative and predictive features (e.g., a location feature in location-based recommender systems) and a smaller dimension to less informative features. Further, different feature fields 208 may have different cardinality (the number of unique values) allowed for the feature (e.g., skill IDs). For example, the gender feature has only two possible values (male and female), while the item ID feature in a shopping service or video-serving website usually involves millions of unique values. Thus, it is clear that embedding the gender feature with the same cardinality as the item ID feature is a large waste of resources.

It is reasonable to think that allocating larger dimensions to the feature fields with more unique feature values, to encode their complex relationships with other features, and assigning smaller dimensions to feature fields with smaller, cardinality will result in solving the overfitting problem due to the over-parameterization of all the feature fields. Overfitting happens when a model learns the detail and noise in the training data to the extent that it negatively impacts the performance of the model on new data. This means that the noise or random fluctuations in the training data is picked up and learned as concepts by the model. The problem is that these concepts do not apply to new data and negatively impact the model's ability to generalize.

Thus, embodiments assign different embedding dimensions to different feature fields in a memory-efficient manner. The problem, however, is how to determine what the optimal embedding size is for each feature.

The techniques presented enable the use of different embedding dimensions for different feature fields for recommender systems and provide automated systems for determining the best embedding dimension for each feature field. Assigning multiple embedding sizes is challenging for several reasons. First, the relationship among embedding dimensions, feature distributions, and neural network architectures is highly intricate, which makes it hard to manually assign embedding dimensions to each feature field. Second, real-world recommender systems often involve hundreds and thousands of feature fields. It is difficult, sometimes virtually impossible, to manually select different dimensions for M feature fields due to the expensive computation cost from the incredibly large number of candidate dimensions N, a search space of $N^M$.

The techniques presented create a recommender architecture that can efficiently allocate embedding dimensions to different feature fields in an automated and data-driven manner. Experiments on benchmark datasets demonstrate the effectiveness of the proposed framework.

Figure 3:
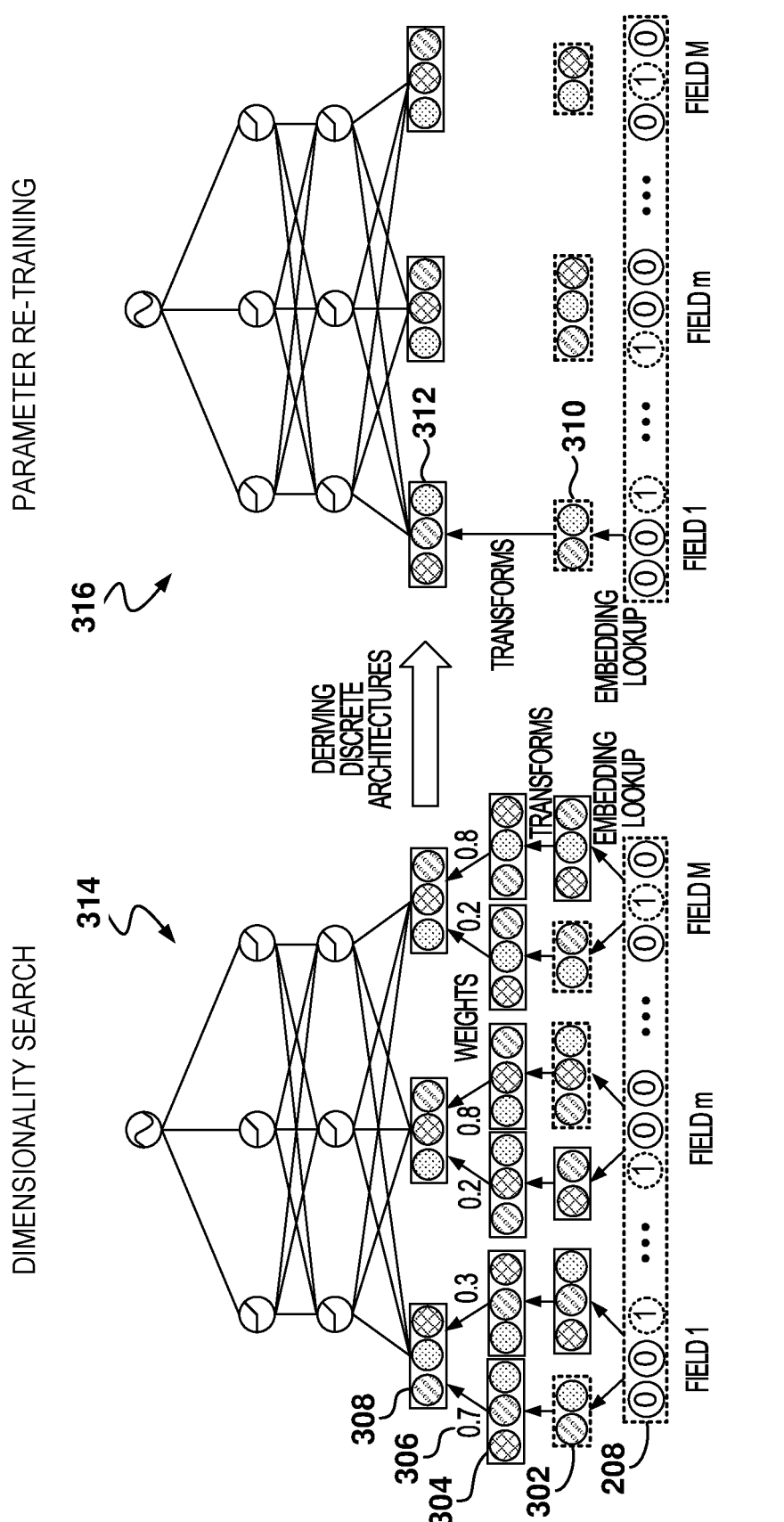
FIG. 3 illustrates the search for the optimal embedding size, according to some example embodiments.

FIG. 3 illustrates the search for the optimal embedding size, according to some example embodiments. To achieve the automated allocation of different embedding dimensions to different feature fields, a methodology is presented, referred to herein as the AutoML framework, to address the challenges discussed above.

One goal is the assignment of different embedding dimensions to different feature fields in an automated manner to enhance the memory efficiency and the performance of the recommender system. As illustrated in FIG. 3, the AutoML framework includes two stages: dimensionality search 314 and parameter re-training 316.

During dimensionality search 314, the aim is to find the optimal embedding dimension for each feature field. Initially, a set of candidate embeddings 302 is created with different dimensions for one or more of the feature fields 208 via an embedding-lookup operation. In the illustrated example, for feature field 1, two embeddings 302 are created, one with a dimension of two and one with a dimension of three. This is an illustrative example, and some implementations may create a different number of embedding sizes, such as in the range from two to a thousand.

The candidate embeddings 302 are then transformed to a common dimension in a transformation operation resulting in embeddings 304. In the illustrated example, the embeddings 304 have a common dimension of three. More details are provided below with reference to FIGS. 4-5 on how to transform the embeddings to a common dimension. This common dimension is used because of the fixed input dimension of the first MLP layer.

It is noted that the data for the recommendation system is divided into a training set and a validation set. Each candidate embedding 302 is assigned a weight, and these weights are optimized using the validation set. The weights represent the probability that the corresponding embedding size is the best embedding size for the feature field, where the best embedding size corresponds to an embedding that provides optimal information about the feature field for use with the DLRS. That is, a size bigger than the best embedding size will not provide additional information while requiring more memory. A size smaller than the best embedding size will lose some value of the information provided by the feature field 208.

In the illustrated example, two weights are calculated for feature field 1: a 0.7 for an embedding size of two and a 0.3 for an embedding size of three. Thus, the embedding size of two has a greater weight, so this embedding size will be selected as the embedding size for feature field 1. For field m, the respective weights are 0.2 and 0.8; therefore, the embedding size of three will be selected for feature field m because it has a greater weight.

In some example embodiments, the DLRS parameters, including the MLP layers are learned using the training set, while the weights for the candidate embeddings are learned using the validation set, which prevents the framework selecting the embedding dimensions that overfit the training set. More details on this process are provided below with reference to FIG. 7.

In practice, the same initial weights may be chosen for all the embedding sizes, and then perform an initial training of the DLRS including all the candidate embeddings, referred to as pre-training of the DLRS. The pre-training of the DLRS enables a fair competition between candidate embeddings to start the optimization of the embedding weights.

The formal embedding 308 for this categorical feature is obtained by computing the weighted sum of all its transformed candidate embeddings 304 using the calculated weights, and the formal embedding 308 is fed in as an input into the MLP-component.

As described in more detail below, dimensionality search 314 is an iterative process where the weights and the network parameters are improved iteratively until convergence is found.

During parameter re-training 316, the embedding weights learned in the dimensionality search 314 stage are used to select the embedding dimension that has the highest weight for each feature field. Then the parameters of DLRS (e.g., MLPs) are retrained, using the selected embeddings, with the training dataset. It is noted that the parameter re-training 316 stage is used because during the dimensionality search 314, the model performance is influenced by the suboptimal embedding dimensions, which are not desired in practical recommender system. Further, the new embeddings 310 are still unified into the same dimension embedding 312, since most existing DLRS capture the interactions between two feature fields via an interaction operation (e.g., inner product) over their embedding vectors. These interaction operations constrain the embedding vectors to have the same dimension.

It is noted that, in some embodiments, numerical features are converted into categorical features through bucketing, although this operation is omitted in the following description for simplicity.

Figure 4:
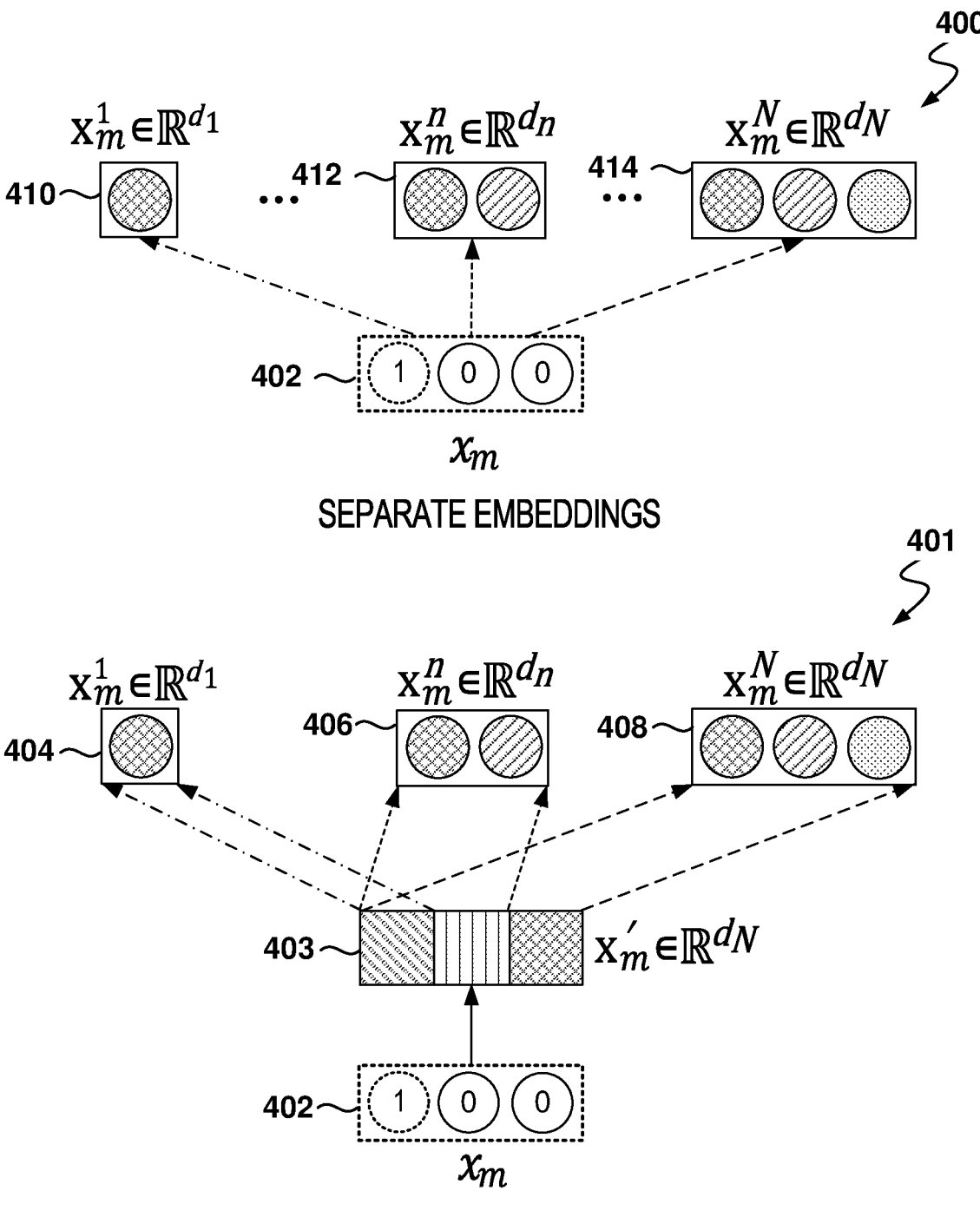
FIG. 4 illustrates embedding-dimension search methods, according to some example environments.

FIG. 4 illustrates embedding-dimension search methods, according to some example environments. As mentioned above, different feature fields have different embedding cardinalities and various contributions to the final prediction. Inspired by this phenomenon, it is highly desired to enable various embedding dimensions for different feature fields. However, due to a large amount of feature fields and the complex relationship between embedding dimensions with feature distributions and neural network architectures, it is difficult to manually select embedding dimensions via conventional dimension reduction methods. In some example embodiments, the solution is to assign several embedding spaces with various dimensions to each feature field and let the DLRS automatically select the optimal embedding dimension for each feature field.

There are several techniques for obtaining embeddings of different dimensions for a feature. Assume that for each user-item interaction instance, there are M input features $(x_1, \ldots, x_M)$ and each feature $x_m$ belongs to a specific feature field (e.g., gender, age). For the $m^{th}$ feature field $x_m$ 402, N candidate embedding spaces $\{X_m^1, \ldots, X_m^N\}$ are assigned (e.g., candidate embeddings 410 of size 1, 412 of size n, and 414 of size N). The dimension of an embedding in each space is $d_1, \ldots, d_N$, where $d_1 < \ldots < d_N$; and the cardinality of these embedding spaces are the number of unique feature values in this feature field. Correspondingly, $\{x_m^1, \ldots, x_m^N\}$ is the set of candidate embeddings for a given feature $x_m$ from all embedding spaces, as shown in approach 400. In some example embodiments, the same candidate dimension is assigned to all feature fields for simplicity, other embodiments may utilize different candidate sets with different dimensions.

Therefore, in approach 400, the total space assigned to the feature $x_m$ is $\Sigma_{n=1}^{N} d_n$. However, in real-world recommender systems with thousands of feature fields, two challenges lie in this design: the system needs a very large space to store all candidate embeddings, and the training efficiency is reduced since a large number of parameters need to be learned.

To address these challenges, an alternative solution for large-scale recommendations is proposed, named a weight-sharing embedding approach 401. As illustrated in approach 401, a $d_N$-dimensional embedding 403 is allocated to a given feature $x_m$, referred as to $x_m'$ 403 with a dimension of $d_N$. The candidate embeddings (404, 406, 408) with different sizes are then derived from $x_m'$ 403 by selecting a number of the beginning values in the vector of the embedding $x_m'$ 403. Thus, embedding $x_m^1$ with dimension of 1 is formed by selecting the first digit of $x_m'$ 403, and the $n^{th}$ candidate embedding $x_m^n$ 406 corresponds to the first $d_n$ digits of $x_m'$ 403. Further, since $x_m^N$ 408 has a dimension of $d_N$, the same as $x_m'$ 403, then $x_m^N$ 408 will be equal to $x_m'$ 403.

There are at least two advantages associated with the weight-sharing embedding method: reduce the storage space and increase the training efficiency, and, since the digits at the beginning of the embedding $x_m'$ have more chances to be retrieved and then be trained, it is expected that the n beginning digits can capture more essential information of the feature $x_m$.

Figure 5:
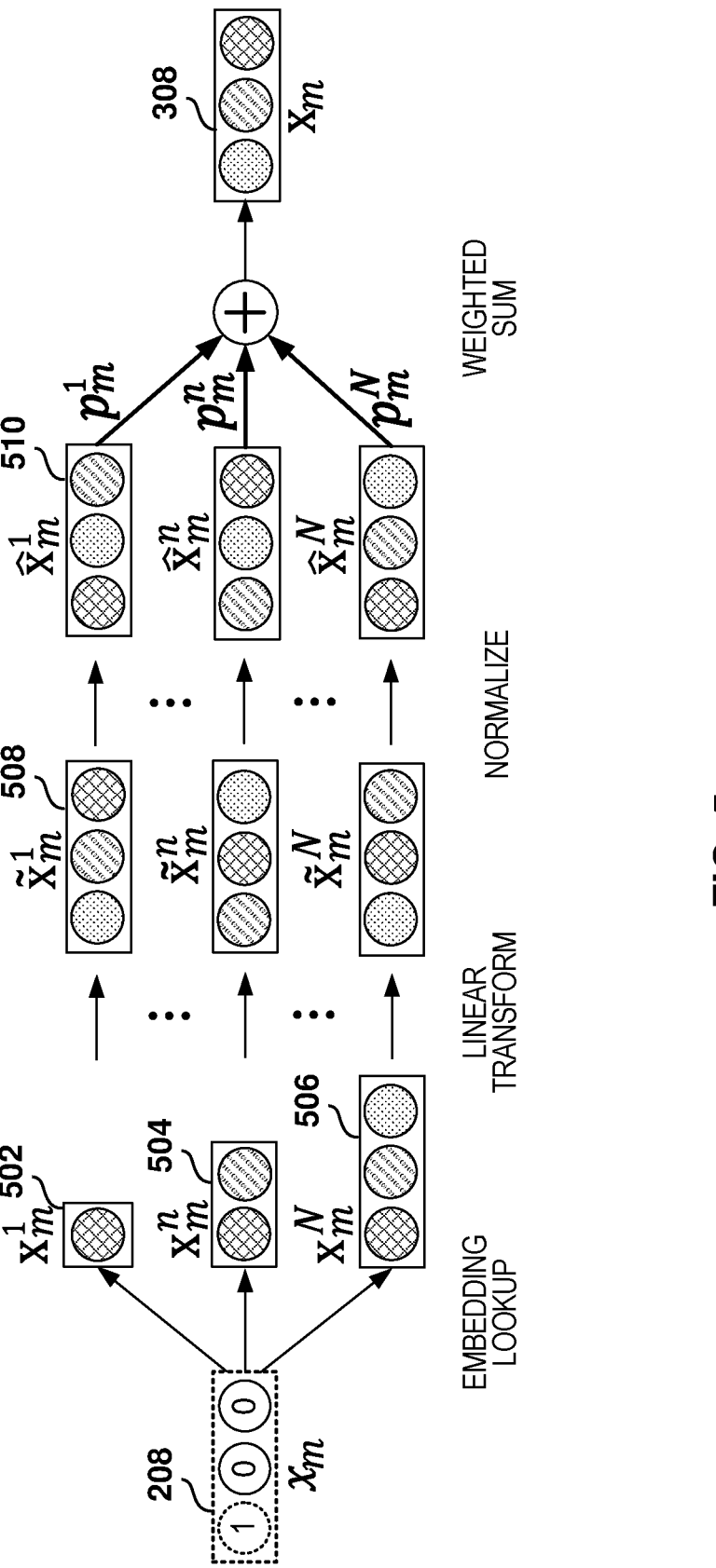
FIG. 5 illustrates the process for obtaining a representative embedding for a feature, according to some example embodiments.

FIG. 5 illustrates the process for obtaining a representative embedding $X_m$ 308 for feature $x_m$ 208, according to some example embodiments. Since the input dimension of the first MLP layer in existing DLRSs is often fixed, it is difficult to handle various candidate dimensions. Thus, the embeddings $\{x_m^1, \ldots, x_m^N\}$ are transformed into embeddings of the same dimension. Two methods are presented below to make the embedding dimension the same. The person skilled in the art will readily appreciate that other variations of methods may also be used to modify the embedding dimension.

FIG. 5 illustrates a method, referred to as the linear transformation method, used to handle the various embedding dimensions (e.g., embeddings 502, 504, 506). At a high level, linear transformation refers to multiplying one vector by a matrix using linear algebra and the result is another vector. In our case each embedding of a different size is multiplied by a different matrix, and after the linear transformation, all the embeddings end up as a vector of the same size, i.e., same dimension.

There are N fully-connected layers, which transform embedding vectors $\{x_m^1, \ldots, x_m^N\}$ into embeddings 508 of the same dimension $d_N$ as follows:

$$\tilde{x}_m^n \leftarrow W_n^T x_m^n + b_n \forall n \in [1,N] \tag{1}$$

In equation (1), $W_n \in \mathbb{R}^{d_n \times d_N}$ is a weight matrix, and $b_n \in \mathbb{R}^{d_N}$ is a bias vector. For each feature field, all candidate embeddings (e.g., 502, 504, 506) with the same dimension share the same weight matrix and bias vector, which can reduce the amount of model parameters. With the linear transformation, the original embedding vectors $\{x_m^1, \ldots, x_m^N\}$ are mapped into the same dimensional space $\{\tilde{x}_m^1, \ldots, \tilde{x}_m^N\} \in \mathbb{R}^{d_N}$, with dimension $d_N$.

In practice, it has been observed that the magnitude of the transformed embeddings $\{\tilde{x}_m^1, \ldots, \tilde{x}_m^N\}$ may vary significantly, which makes it difficult to perform operations with embeddings of very different magnitude, e.g., comparing embeddings, checking for similarity, etc. To correct this, a normalization process is performed on the transformed embeddings $\{\tilde{x}_m^1, \ldots, \tilde{x}_m^N\}$ so the embeddings 510 have magnitudes within a similar range (e.g., magnitudes are at least 10% of the maximum magnitude, but other comparing factors may be used, such as 50%, 1%, 80%). In some example embodiments, a conduct Batch-Norm method is used to normalize the embeddings as follows:

$$\hat{x}_m^n \leftarrow \frac{\tilde{x}_m^n - \mu_{\mathcal{B}}^n}{\sqrt{(\sigma_{\mathcal{B}}^n)^2 + \epsilon}} \forall n \in [1, N] \tag{2}$$

Basically, the normalization includes subtracting the mean and dividing by the standard deviation. In equation (2), $\mu_B^n$ is the mini-batch mean and $(\sigma_B^n)^2$ is the mini-batch variance for $\forall n \in [1, N]$. Further, $\epsilon$ is a small constant added to the mini-batch variance for numerical stability when $(\sigma_B^n)^2$ is very small. After the normalization process, the linearly transformed embeddings $\{\tilde{x}_m^1, \ldots, \tilde{x}_m^N\}$ 508 become comparable-magnitude embedding vectors $\{\hat{x}_m^1, \ldots, \hat{x}_m^N\}$ 510 with the same dimension $d_N$.

Figure 6:
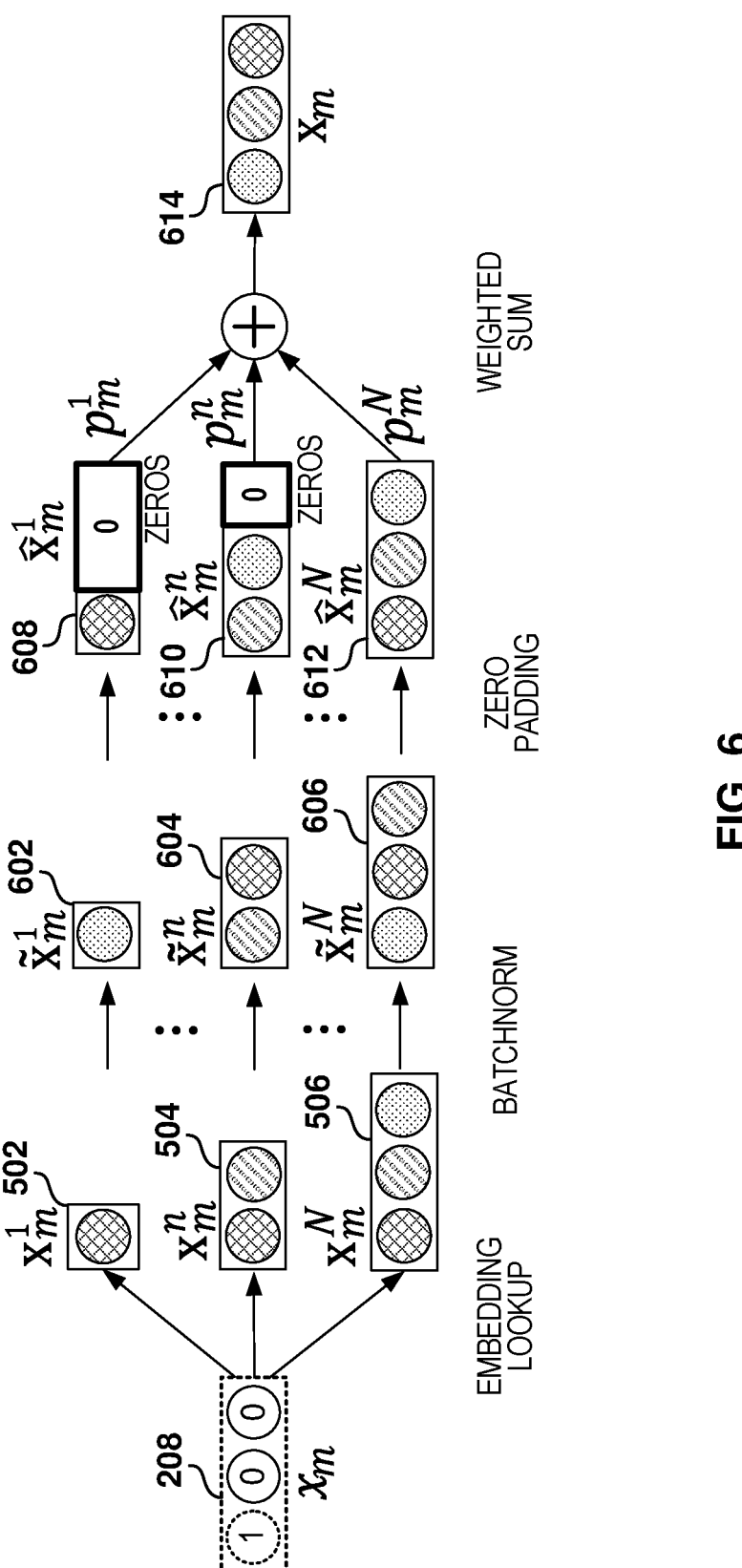
FIG. 6 illustrates a zero-padding embedding transformation, according to some example embodiments.

FIG. 6 illustrates a zero-padding embedding transformation, according to some example embodiments. A second method for transforming the embeddings to the same dimension is referred to as zero padding.

Zero padding includes padding shorter embedding vectors with zeros to have the same length as the longest embedding dimension $d_N$. For the embedding vectors $\{x_i^1, \ldots, x_i^N\}$ (e.g., 502, 504, 506) with different dimensions, a normalization process is performed first to obtain first embedding vectors $\{\tilde{x}_m^1, \ldots, \tilde{x}_m^N\}$ 602, 604, 606. In some example embodiments a Batch-Norm process is used, but another normalization process may be used.

$$\hat{x}_m^n \leftarrow \frac{\tilde{x}_m^n - \mu_{\mathcal{B}}^n}{\sqrt{(\sigma_{\mathcal{B}}^n)^2 + \epsilon}} \forall n \in [1, N] \tag{3}$$

This normalization changes the original embeddings $\{x_i^1, \ldots, x_i^N\}$ into magnitude-comparable embeddings. In equation (3), $\mu_B^n$, $(\mu_B^n)^2$ are the mini-batch mean and variance, and $\epsilon$ is the constant for numerical stability. The transformed $\{\tilde{x}_m^1, \ldots, \tilde{x}_m^N\}$ are magnitude-comparable embeddings.

After the normalization, the $\{\tilde{x}_m^1, \ldots, \tilde{x}_m^{N-1}\}$ embeddings are padded with zeros (e.g., zeroes are added at the end of the embedding vector) to have the same length $d_N$:

$$\hat{x}_m^n \leftarrow \text{padding}(\tilde{x}_m^n, d_N - d_n) \forall n \in [1,N] \tag{4}$$

In equation (4), the second term of each padding formula is the number of zeros to be padded with the embedding vector of the first term. The resulting embeddings $\{\hat{x}_m^1, \ldots, \hat{x}_m^N\}$ (e.g., embeddings 608, 610, 612) share the same dimension $d_N$. Further, the embeddings 608, 610, 612 may be combined (e.g., a weighted sum) based on their respective weights to obtain a combination embedding 614, which can be used as an input to the MLP layer.

Compared with the linear transformation, the zero-padding method reduces the number of linear-transformation computations and corresponding parameters. The possible drawback is that the final embeddings $\{\hat{x}_m^1, \ldots, \hat{x}_m^N\}$ become spatially unbalanced since the tail parts of some final embeddings are zeros.

Figure 7:
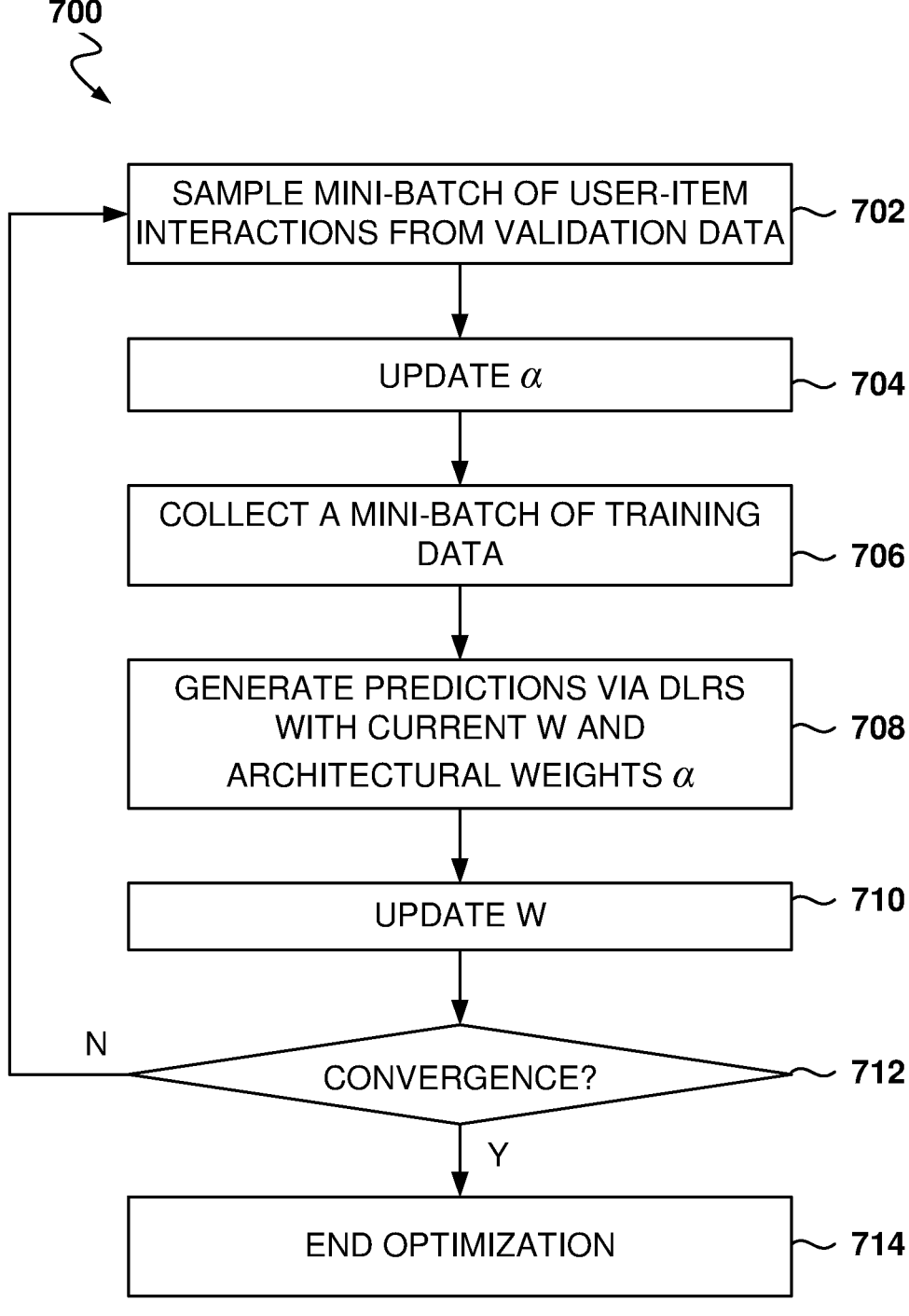
FIG. 7 is a flowchart of a method for optimizing a DLRS, according to some example embodiments.

FIG. 7 is a flowchart of a method for optimizing a DLRS, according to some example embodiments. As discussed above, one goal of the present embodiments is to select the optimal embedding dimension for each feature field in an automated and data-driven manner. However, selecting the optimal embedding sizes is a difficult process because of the need to optimize the embedding size while optimizing also the DLRS. To address the challenge, the selection is approximated over different dimensions via a Gumbel-softmax operation, which simulates the non-differentiable sampling from a categorical distribution by a differentiable sampling from the Gumbel-softmax distribution.

The weights $\{\alpha_m^1, \ldots, \alpha_m^N\}$ are the class probabilities over different dimensions. Then a hard selection z can be drawn via the gumbel-max trick as follows:

$$z = \text{one\_hot}\left(\arg \max_{n\in(1,N)} [\log \alpha_m^n + g_n]\right) \tag{5}$$

$$\text{where } g_n = -\log(-\log(u_n))$$

$$un \sim \text{Uniform}(0, 1)$$

The gumbel noises gi, . . . , gN are i.i.d samples, which perturb $\log \alpha_m^n$ terms and make the arg max operation that is equivalent to drawing a sample by $\alpha_m^1, \ldots, \alpha_m^N$ weights. However, this technique is nondifferentiable due to the arg max operation. To address this problem, a softmax function is used as a continuous, differentiable approximation to the arg max operation, as follows:

$$p_m^n = \frac{\exp\left(\frac{\log(\alpha_m^n) + g_n}{\tau}\right)}{\sum_{i=1}^{N} \exp\left(\frac{\log(\alpha_m^i) + g_i}{\tau}\right)} \tag{6}$$

In equation (6), $\tau$ is a temperature parameter, which controls the smoothness of the output of the gumbel-softmax operation. When $\tau$ approaches zero, the output of the gumbel-softmax becomes closer to a one-hot vector. Further, $p_m^n$ is the probability of selecting the $n^{th}$ candidate embedding dimension for the feature $x_m$, and its embedding $x_m$ can be formulated as the weighted sum of $\{\hat{x}_m^1, \ldots, \hat{x}_m^N\}$ as follows:

$$x_m = \sum_{n=1}^{N} p_m^n \cdot \hat{x}_m^n \forall m\epsilon[1,M] \tag{7}$$

The weighted-sum operations are described above with reference to FIGS. 5-6. With the gumbel-softmax operation, the dimensionality search process is end-to-end differentiable. The discrete embedding dimension selection is conducted based on the weights $\{\alpha_m^n\}$.

Then, the embeddings $h_0=[x_1, \ldots, x_M]$ are fed as input into L multilayer perceptron layers:

$$h_l = \sigma(W_l^T h_{l-1} + b_l) \forall l\epsilon[1,L] \tag{8}$$

In equation (8), $W_l$ is the weight matrix and $b_l$ is the bias vector for the $l^{th}$ MLP layer. Further, $\sigma$ is the activation function (e.g., ReLU, Tanh). Further yet, the output layer that is subsequent to the last MLP layer, produces the prediction of the current user-item interaction instance as follows:

$$\hat{y} = \sigma(W_o^T h_L + b_o) \tag{9}$$

In equation (9), $W_o$ is the weight matrix and $b_o$ is the bias vector for the output layer. The activation function $\sigma$ is selected based on different recommendation tasks, such as a Sigmoid function for regression, and Softmax for multi-class classification. Correspondingly, the objective function $\mathcal{L}(\hat{y}, y)$ between prediction $\hat{y}$ and the ground truth label y also varies based on different recommendation tasks. In some example embodiments, the following negative log-likelihood function is used:

$$\mathcal{L}(\hat{y},y)=-y \log \hat{y}-(1-y)\log(1-\hat{y}) \tag{10}$$

Further, y is the ground truth (e.g., 1 for alike or a click, 0 otherwise). By minimizing the objective function $\mathcal{L}(\hat{y}, y)$, the dimensionality search 314, illustrated in FIG. 3, updates the parameters of the neural network, hidden layers, embeddings, and weights $\{\alpha_m^n\}$ through back-propagation.

The optimization method 700 includes a plurality of iterations. In each iteration, a batch of user-item interaction data is sampled from the validation set at operation 702.

From operation 702, the method 700 flows to operation 704 to update the weights $\alpha$ by descending $\nabla_\alpha \mathcal{L}_{val}(W^*(\alpha), \alpha)$ utilizing equation (12) described below.

From operation 704, the method 700 flows to operation 706 to collect a mini-batch of training data. At operation 708, the DLRS generates the predictions $\hat{y}$ on the mini-batch of training data with the current DLRS parameters W and weights $\alpha$.

At operation 710, the DLRS parameter W is updated by descending $\nabla_W \mathcal{L}_{train}(W, \alpha)$. At operation 712, a check is made to determine if convergence has been accomplished. If there is convergence, the optimization method 700 ends 714, and if there is no convergence yet, the method flows back to operation 702 to perform a new iteration.

There are two set of values to be optimized: W, which represents the parameters of the DLRS (including the embedding-component and the MLP-component); and $\alpha$ which represents the weights $\{\alpha_m^n\}$ on different embedding spaces ($\{p_m^n\}$ are calculated based on $\{\alpha_m^n\}$ as described in equation (6)). The DLRS parameters W and the weights $\alpha$ cannot be optimized simultaneously on a training dataset with a conventional supervised attention mechanism because the optimization of W and $\alpha$ are highly dependent on each other. In other words, simultaneously optimization on training dataset may result in model overfitting on the examples from training dataset.

To avoid this problem, and some example embodiments, W and $\alpha$ are alternately optimized through gradient descent. Gradient descent is a first-order iterative optimization algorithm for finding a local minimum of a differentiable function. The idea is to take repeated steps in the opposite direction of the gradient (or approximate gradient) of the function at the current point, because this is the direction of steepest descent.

During each iteration, there two operations: a first operation to update $\alpha$ and a second operation to update W. The update of $\alpha$ includes optimizing the loss function $\mathcal{L}_{val}$ on the validation data while keeping W fixed (operations 702 and 704), and updating W includes optimizing the loss function $\mathcal{L}_{train}$ on the training data while $\alpha$ is fixed (operations 708 and 710), as follows:

$$\text{s.t.}\, W^*(\alpha) = \underset{W}{\operatorname{argmin}}\mathcal{L}_{train}(W, \alpha^*) \tag{11}$$

This optimization is a bilevel optimization problem, where weights $\alpha$ and DLRS parameters W are identified as the upper-level variable and lower-level variable. Since the inner optimization of W is computationally expensive, directly optimizing $\alpha$ via equation (11) is intractable.

To address this challenge, the approximation scheme of DARTS is used as follows:

$$\underset{W}{\operatorname{argmin}}\mathcal{L}_{train}(W, \alpha^*) \approx W - \xi \overline{V}_W \mathcal{L}_{train}(W, \alpha) \tag{12}$$

In equation (12), $\xi$ is the learning rate. In the approximation scheme, when updating $\alpha$ via equation (12), $W^*(\alpha)$ is estimated by descending the gradient $\nabla_W \mathcal{L}_{train}(W, \alpha)$ for only one cycle, rather than optimizing $W(\alpha)$ thoroughly to obtain $W^*(\alpha)=\arg\min_W \mathcal{L}_{train}(W, \alpha^*)$. In practice, it usually leverages the first-order approximation by setting $\xi=0$, which can further enhance the computation efficiency.

In some example embodiments, a pre-train technique is used to enable a fair competition between the candidate embeddings. For each feature field, the equivalent weights are allocated initially on all its candidate embeddings, e.g., [0.5, 0.5]. If there are two candidate embedding dimensions, then, these initialized weights $\alpha$ are fixed and pre-train the DLRS parameters W including all candidate embeddings. This process ensures a fair competition between candidate embeddings when the process begins to update $\alpha$.

FIG. 8 is a flowchart of a method 800 for optimization the DLRS after the embedding sizes are determined, according to some example embodiments. The parameter retraining 316 is illustrated in FIG. 3.

Since the suboptimal embedding dimensions in dimensionality search stage also influence the model training, a re-training stage is desired to training the model with only the optimal dimensions, which eliminates these suboptimal influences. The method 800 is for selecting optimal embedding dimensions for each feature field and the details of re-training the recommender system with the selected embedding dimensions.

Given the selected embedding spaces, unique embedding vectors ($x_1, \ldots, x_M$) are obtained for features ($x_1, \ldots, x_M$). The method concatenates these embeddings and feeds them into hidden layers. The prediction $\hat{y}$ is generated by the output layer. Further, the parameters of the DLRS are updated by minimizing the supervised loss function $\mathcal{L}(\hat{y}, y)$ through back-propagation. The model re-training algorithm is illustrated in FIG. 8. The re-training process is based on the same training data as used in method 700 of FIG. 7.

The majority of existing DLRS capture the interactions between feature fields via interaction operations, such as inner product and Hadamard product. These interaction operations require the embedding vectors from all fields to have the same dimensions. Therefore, the embeddings are mapped into the same dimension as described above. During the re-training stage, the normalization operation is no longer in use, since there are no comparisons between candidate embeddings in each field. Unifying embeddings into the same dimension does not increase model parameters and computations too much for the two embedding methods described above: linear transformation uses embeddings from the feature fields share the same weight matrix and bias vector, and with zero-padding, no extra trainable parameters are introduced.

During re-training, the gumbel-softmax operation is no longer used, which means that the optimal embedding space (dimension) are selected for each feature field as the one corresponding to the largest weight calculated with method 700, based on the well-learned $\alpha$. It is defined as follows:

$$X_m = X_m^k, \text{ where } k = \arg \max_{n \in [1,N]} \alpha_m^n \forall m \in [1,M] \tag{13}$$

Dimensionality search 314 of FIG. 3 illustrates the architecture for dimensionality search with an example about the optimal dimension selections based on two candidate dimensions, where the largest weights, corresponding to the $1^{st}$, $m^{th}$, and $M^{th}$ feature fields, are 0.7, 0.8 and 0.6. The embedding space $X_1^1$, $X_m^2$, and $X_M^1$ is selected for these feature fields. The dimension of an embedding vector in these embedding spaces is $d_1$, $d_2$, and $d_1$, respectively.

The method 800 includes iterations until convergence is found. At operation 802, a mini-batch of training data is sampled.

At operation 804, the predictions $\hat{y}$ are obtained via DLRS with the current set of values for W.

At operation 806, W is updated via the descending $\nabla_W \mathcal{L}_{train}(W)$.

At operation 808, a check is made to determine if there is convergence of the optimization. If there is no convergence, the method 800 flows back to operation 802 for another iteration, and if there is convergence the optimization ends 810.

The resulting model W with $\alpha$ values is then used to make recommendations, or for some other predictive function.

Figure 9:
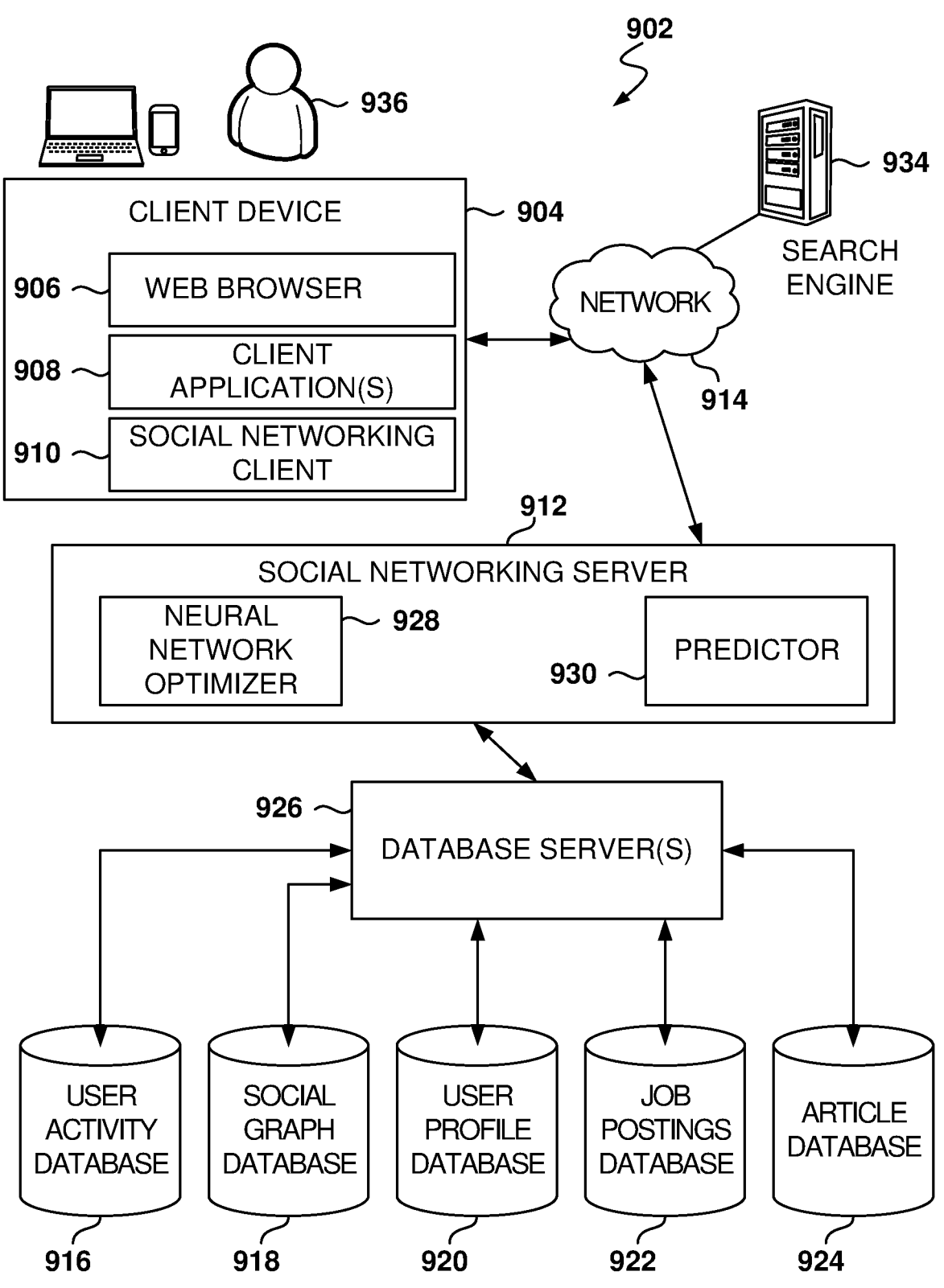
FIG. 9 is a block diagram illustrating a networked system, according to some example embodiments, including a social networking server, illustrating an example embodiment of a high-level client-server-based network architecture.

FIG. 9 is a block diagram illustrating a networked system, according to some example embodiments, including a social networking server 912, illustrating an example embodiment of a high-level client-server-based network architecture 902. Embodiments are presented with reference to an online service, and, in some example embodiments, the online service is a social networking service.

The social networking server 912 provides server-side functionality via a network 914 (e.g., the Internet or a wide area network (WAN)) to one or more client devices 904. FIG. 9 illustrates, for example, a web browser 906, client application(s) 908, and a social networking client 910 executing on a client device 904. The social networking server 912 is further communicatively coupled with one or more database servers 926 that provide access to one or more databases 916-724.

The social networking server 912 includes, among other modules, a neural network optimizer 928 and a predictor 930. The neural network optimizer 928 finds an optimal neural network by determining optimal embeddings for the feature fields, as described above. The predictor 930 makes predictions (e.g., recommendations) using the optimized neural network calculated by the neural network optimizer 928.

The client device 904 may comprise, but is not limited to, a mobile phone, a desktop computer, a laptop, a tablet, a netbook, a multi-processor system, a microprocessor-based or programmable consumer electronic system, or any other communication device that a user 936 may utilize to access the social networking server 912. In some embodiments, the client device 904 may comprise a display module (not shown) to display information (e.g., in the form of user interfaces).

In one embodiment, the social networking server 912 is a network-based appliance that responds to initialization requests or search queries from the client device 904. One or more users 936 may be a person, a machine, or other means of interacting with the client device 904. In various embodiments, the user 936 interacts with the network architecture 902 via the client device 904 or another means.

The client device 904 may include one or more applications (also referred to as "apps") such as, but not limited to, the web browser 906, the social networking client 910, and other client applications 908, such as a messaging application, an electronic mail (email) application, a news application, and the like. In some embodiments, if the social networking client 910 is present in the client device 904, then the social networking client 910 is configured to locally provide the user interface for the application and to communicate with the social networking server 912, on an as-needed basis, for data and/or processing capabilities not locally available (e.g., to access a user profile, to authenticate a user 936, to identify or locate other connected users 936, etc.). Conversely, if the social networking client 910 is not included in the client device 904, the client device 904 may use the web browser 906 to access the social networking server 912.

In addition to the client device 904, the social networking server 912 communicates with the one or more database servers 926 and databases 916-724. In one example embodiment, the social networking server 912 is communicatively coupled to a user activity database 916, a social graph database 918, a user profile database 920, a job postings database 922, and an article database 924. The databases 916-724 may be implemented as one or more types of databases including, but not limited to, a hierarchical database, a relational database, an object-oriented database, one or more flat files, or combinations thereof.

The user profile database 920 stores user profile information about users 936 who have registered with the social networking server 912. With regard to the user profile database 920, the user 936 may be an individual person or an organization, such as a company, a corporation, a nonprofit organization, an educational institution, or other such organizations.

In some example embodiments, when a user 936 initially registers to become a user 936 of the social networking service provided by the social networking server 912, the user 936 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 920. Similarly, when a representative of an organization initially registers the organization with the social networking service provided by the social networking server 912, the representative may be prompted to provide certain information about the organization, such as a company industry.

As users 936 interact with the social networking service provided by the social networking server 912, the social networking server 912 is configured to monitor these interactions. Examples of interactions include, but are not limited to, commenting on posts entered by other users 936, viewing user profiles, editing or viewing a user 936's own profile, sharing content outside of the social networking service (e.g., an article provided by an entity other than the social networking server 912), updating a current status, posting content for other users 936 to view and comment on, posting job suggestions for the users 936, searching job postings, and other such interactions. In one embodiment, records of these interactions are stored in the user activity database 916, which associates interactions made by a user 936 with his or her user profile stored in the user profile database 920.

The job postings database 922 includes job postings offered by companies. Each job posting includes job-related information such as any combination of employer, job title, job description, requirements for the job posting, salary and benefits, geographic location, one or more job skills desired, day the job posting was posted, relocation benefits, and the like.

While the database server(s) 926 are illustrated as a single block, one of ordinary skill in the art will recognize that the database server(s) 926 may include one or more such servers. Accordingly, and in one embodiment, the database server(s) 926 implemented by the social networking service are further configured to communicate with the social networking server 912.

The network architecture 902 may also include a search engine 934. Although only one search engine 934 is depicted, the network architecture 902 may include multiple search engines 934. Thus, the social networking server 912 may retrieve search results (and, potentially, other data) from multiple search engines 934. The search engine 934 may be a third-party search engine.

Figure 10:
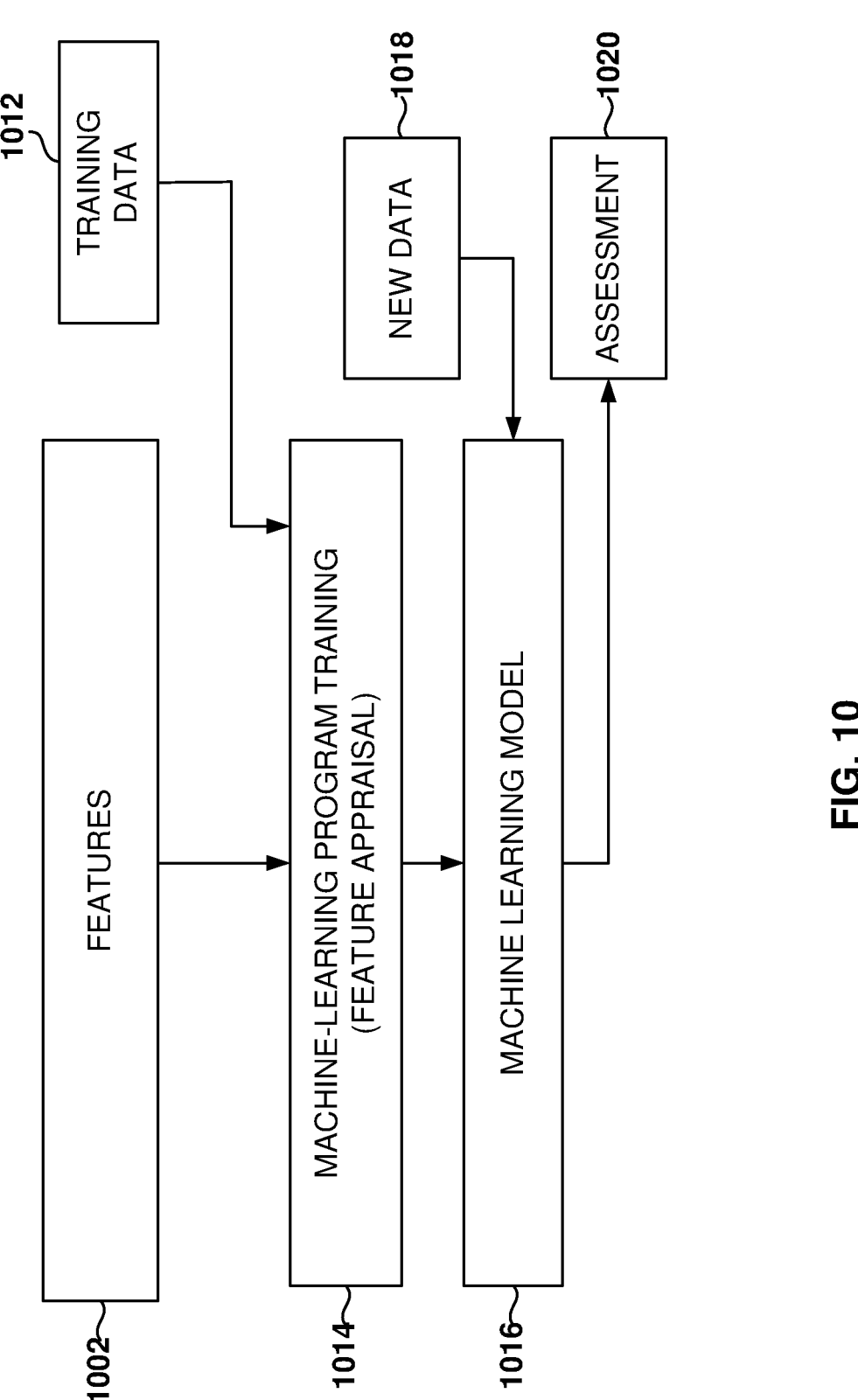
FIG. 10 illustrates the training and use of a machine-learning model, according to some example embodiments.

FIG. 10 illustrates the training and use of a machine-learning model, according to some example embodiments. In some example embodiments, machine-learning (ML) models 1016, are utilized to perform operations associated with searches, such as suggesting search queries.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 1016 from example training data 1012 in order to make data-driven predictions or decisions expressed as outputs or assessments 1020. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data. In some embodiments, example ML model 1016 provides a search-query suggestion.

The training data 1012 comprises examples of values for the features 1002. In some example embodiments, validation data is used to check for the accuracy of the ML model 1016. In some example embodiments, the training data comprises labeled data with examples of values for the features and labels indicating the outcome, such as queries previously entered by users, positive interactions with results, recommendations adopted by the users, etc. The machine-learning algorithms utilize the training data 1012 to find correlations among identified features 1002 that affect the outcome. A feature 1002 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example embodiment, the features 1002 may be of different types and may include one or more of user profile information, item information, user activity, etc.

During training 1014, the ML program, also referred to as ML algorithm or ML tool, analyzes the training data 1012 based on identified features 1002 and configuration parameters defined for the training. The result of the training 1014 is the ML model 1016 that is capable of taking inputs to produce assessments.

Training an ML algorithm involves analyzing large amounts of data (e.g., from several gigabytes to a terabyte or more) in order to find data correlations. The ML algorithms utilize the training data 1012 to find correlations among the identified features 1002 that affect the outcome or assessment 1020.

The ML algorithms usually explore many possible functions and parameters before finding what the ML algorithms identify to be the best correlations within the data; therefore, training may make use of large amounts of computing resources and time.

Some examples of model parameters include maximum model size, maximum number of passes over the training data, data shuffle type, regression coefficients, decision tree split locations, and the like. Hyperparameters may include the number of hidden layers in a neural network, the number of hidden nodes in each layer, the learning rate (perhaps with various adaptation schemes for the learning rate), the regularization parameters, types of nonlinear activation functions, and the like. Finding the correct (or the best) set of hyperparameters can be a time-consuming task that makes use of a large amount of computer resources.

When the ML model 1016 is used to perform an assessment, new data 1018 is provided as an input to the ML model 1016, and the ML model 1016 generates the assessment 1020 as output. For example, when a search query is entered by the user, related search queries are presented to the user. In other embodiments, query suggestions may also be presented in response to user interactions with the online service.

FIG. 11 is a flowchart of a method 1100 for determining parameters of neural networks and selecting embedding dimensions for the feature fields, according to some example embodiments. While the various operations in this flowchart are presented and described sequentially, one of ordinary skill will appreciate that some or all of the operations may be executed in a different order, be combined or omitted, or be executed in parallel.

Operation 1102 is for initializing parameters of a neural network and weights for a plurality of embedding sizes for each feature associated with the neural network.

From operation 1102, the method 1100 flows to operation 1104 to iteratively optimize the parameters of the neural network and the weights. Each optimization iteration comprises operations 1106 and 1108.

At operation 1106, the neural network is trained with current parameters of the neural network to optimize a value of the weights. At operation 1108, the neural network is trained with current values of the weights to optimize the parameters of the neural network.

From operation 1104, the method 1100 flows to operation 1110 for selecting embedding sizes for the features based on the optimized values of the weights.

From operation 1110, the method 1100 flows to operation 1112 to train the neural network based on the selected embedding sizes for the features to obtain an estimator model.

From operation 1112, the method 1100 flows to operation 1114 to generate a prediction utilizing the estimator model.

In one example, selecting embedding sizes further comprises: setting the embedding sizes of the features based on the optimized values of the weights obtained from the iterative optimization, and transforming the embedding of the features to vectors of a common dimension.

In one example, the initializing further comprises generating a plurality of embedding for each feature, each embedding associated with a respective weight.

In one example, the method 1100 further comprises, for each feature:

transforming a plurality of embeddings for the feature to embeddings of a same dimension, and combining the transformed embeddings based on the weights to obtain a formal embedding for the feature, wherein the formal embedding is an input to the neural network.

In one example, transforming the plurality of embeddings to embeddings of the same dimension comprises performing a linear transformation of the plurality of embeddings, and normalizing the plurality of embeddings resulting from the linear transformation.

In one example, transforming the plurality of embeddings to embeddings of the same dimension comprises normalizing the plurality of embeddings, and padding with zeros the normalized plurality of embeddings.

In one example, the features are selected from a group comprising user information, item identifier, contextual information, and historical data of interactions of users with an online service.

Another general aspect is for a system that includes a memory comprising instructions and one or more computer processors. The instructions, when executed by the one or more computer processors, cause the one or more computer processors to perform operations comprising: initializing parameters of a neural network and weights for a plurality of embedding sizes for each feature associated with the neural network; iteratively optimizing the parameters of the neural network and the weights, each optimization iteration comprising: training the neural network with current parameters of the neural network to optimize a value of the weights; and training the neural network with current values of the weights to optimize the parameters of the neural network; selecting embedding sizes for the features based on the optimized values of the weights; training the neural network based on the selected embedding sizes for the features to obtain an estimator model; and generating a prediction utilizing the estimator model.

In yet another general aspect, a machine-readable storage medium (e.g., a non-transitory storage medium) includes instructions that, when executed by a machine, cause the machine to perform operations comprising: initializing parameters of a neural network and weights for a plurality of embedding sizes for each feature associated with the neural network; iteratively optimizing the parameters of the neural network and the weights, each optimization iteration comprising: training the neural network with current parameters of the neural network to optimize a value of the weights; and training the neural network with current values of the weights to optimize the parameters of the neural network; selecting embedding sizes for the features based on the optimized values of the weights; training the neural network based on the selected embedding sizes for the features to obtain an estimator model; and generating a prediction utilizing the estimator model.

Performance evaluations of the AutoML framework compared to other common recommender algorithms showed a reduction in the number of parameters, e.g., from 30 million to 11 million. Additionally, a significant reduction was found when searching for the best neural networks, with some experiments showing searches performed seven times faster when compared to other frameworks. Further yet, AutoML showed an improvement in accuracy of predictions.

Figure 12:
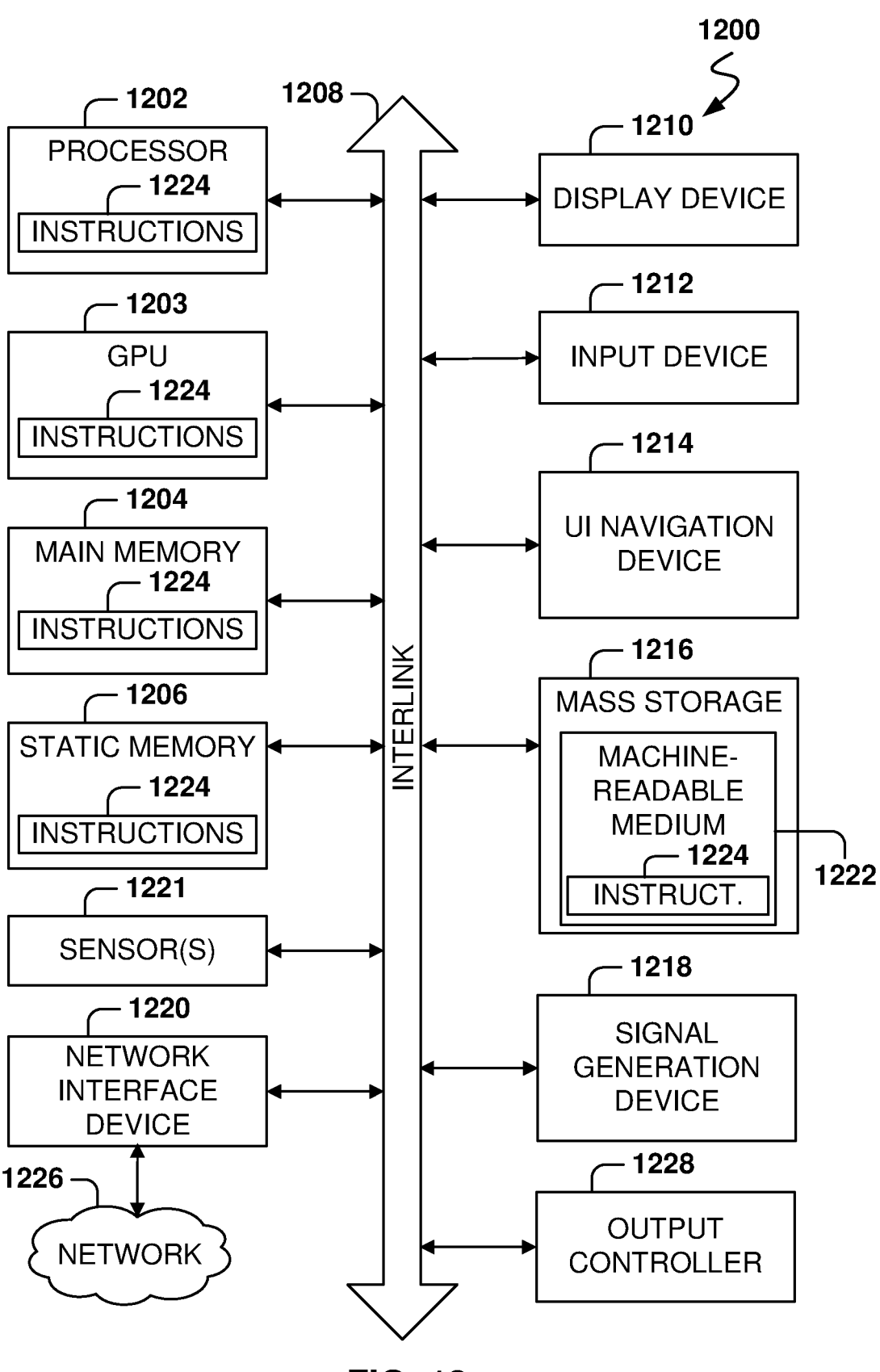
FIG. 12 is a block diagram illustrating an example of a machine upon or by which one or more example process embodiments described herein may be implemented or controlled.

FIG. 12 is a block diagram illustrating an example of a machine 1200 upon or by which one or more example process embodiments described herein may be implemented or controlled. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in a peer-to-peer (P2P) (or other distributed) network environment. Further, while only a single machine 1200 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1200 may include a hardware processor 1202 (e.g., a central processing unit (CPU), a hardware processor core, or any combination thereof), a graphics processing unit (GPU) 1203, a main memory 1204, and a static memory 1206, some or all of which may communicate with each other via an interlink (e.g., bus) 1208. The machine 1200 may further include a display device 1210, an alphanumeric input device 1212 (e.g., a keyboard), and a user interface (UI) navigation device 1214 (e.g., a mouse). In an example, the display device 1210, alphanumeric input device 1212, and UI navigation device 1214 may be a touch screen display. The machine 1200 may additionally include a mass storage device (e.g., drive unit) 1216, a signal generation device 1218 (e.g., a speaker), a network interface device 1220, and one or more sensors 1221, such as a Global Positioning System (GPS) sensor, compass, accelerometer, or another sensor. The machine 1200 may include an output controller 1228, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1216 may include a machine-readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within the static memory 1206, within the hardware processor 1202, or within the GPU 1203 during execution thereof by the machine 1200. In an example, one or any combination of the hardware processor 1202, the GPU 1203, the main memory 1204, the static memory 1206, or the mass storage device 1216 may constitute machine-readable media.

While the machine-readable medium 1222 is illustrated as a single medium, the term "machine-readable medium" may include a single medium, or multiple media, (e.g., a centralized or distributed database, and/or associated caches and servers) configured to store the one or more instructions 1224.

The term "machine-readable medium" may include any medium that is capable of storing, encoding, or carrying instructions 1224 for execution by the machine 1200 and that cause the machine 1200 to perform any one or more of the techniques of the present disclosure, or that is capable of storing, encoding, or carrying data structures used by or associated with such instructions 1224. Non-limiting machine-readable medium examples may include solid-state memories, and optical and magnetic media. In an example, a massed machine-readable medium comprises a machine-readable medium 1222 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device 1220.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
initializing parameters of a neural network and weights for a plurality of embedding sizes for each feature associated with the neural network, wherein, for at least one feature of the features associated with the neural network, two or more candidate embedding sizes are assigned respective weights, wherein an embedding size comprises a size of a vector of a corresponding feature, and a parameter comprises a value within a vector of a corresponding feature;
iteratively optimizing the parameters of the neural network and the weights for the plurality of embedding sizes, each optimization iteration comprising:

training the neural network with current parameters of the neural network to optimize a value of the weights of the candidate embedding sizes; and
training the neural network with current values of the weights to optimize the parameters of the neural network, wherein learned embedding weights from the current optimization iteration are used to select embedding sizes that have a highest current value for each feature;
selecting embedding sizes for the features based on the optimized values of the weights;
training the neural network based on the selected embedding sizes for the features to obtain an estimator model; and
generating a prediction utilizing the estimator model.

2. The method as recited in claim 1, wherein selecting embedding sizes further comprises:
setting the embedding sizes of the features based on the optimized values of the weights obtained from the iterative optimization; and
transforming the embedding of the features to vectors of a common dimension.

3. The method as recited in claim 1, wherein the initializing further comprises:
generating a plurality of embeddings for each feature, each embedding associated with a respective weight.

4. The method as recited in claim 3, further comprising:
for each feature:
transforming a plurality of embeddings for the feature to embeddings of a same dimension; and
combining the transformed embeddings based on the weights to obtain a formal embedding for the feature, wherein the formal embedding is an input to the neural network.

5. The method as recited in claim 4, wherein transforming the plurality of embeddings to embeddings of the same dimension comprises:
performing a linear transformation of the plurality of embeddings; and
normalizing the plurality of embeddings resulting from the linear transformation.

6. The method as recited in claim 4, wherein transforming the plurality of embeddings to embeddings of the same dimension comprises:
normalizing the plurality of embeddings; and
padding with zeros the normalized plurality of embeddings.

7. The method as recited in claim 1, wherein the features comprise one or more of: user information, item identifier, contextual information, or historical data of interactions of users with an online service.

8. A system comprising:
a memory comprising instructions; and
one or more computer processors, wherein the instructions, when executed by the one or more computer processors, cause the system to perform operations comprising:
initializing parameters of a neural network and weights for a plurality of embedding sizes for each feature associated with the neural network, wherein, for at least one feature of the features associated with the neural network, two or more candidate embedding sizes are assigned respective weights, wherein an embedding size comprises a size of a vector of a corresponding feature, and a parameter comprises a value within a vector of a corresponding feature;

iteratively optimizing the parameters of the neural network and the weights, each optimization iteration comprising:

training the neural network with current parameters of the neural network to optimize a value of the weights of the candidate embedding sizes; and training the neural network with current values of the weights to optimize the parameters of the neural network, wherein learned embedding weights from the current optimization iteration are used to select embedding sizes that have a highest current value for each feature;

selecting embedding sizes for the features based on the optimized values of the weights;

training the neural network based on the selected embedding sizes for the features to obtain an estimator model; and generating a prediction utilizing the estimator model.

9. The system as recited in claim 8, wherein selecting embedding sizes further comprises:

setting the embedding sizes of the features based on the optimized values of the weights obtained from the iterative optimization; and transforming the embedding of the features to vectors of a common dimension.

10. The system as recited in claim 8, wherein the initializing further comprises:

generating a plurality of embedding for each feature, each embedding associated with a respective weight.

11. The system as recited in claim 10, wherein the instructions further cause the one or more computer processors to perform operations comprising:

for each feature:

transforming a plurality of embeddings for the feature to embeddings of a same dimension; and combining the transformed embeddings based on the weights to obtain a formal embedding for the feature, wherein the formal embedding is an input to the neural network.

12. The system as recited in claim 11, wherein transforming the plurality of embeddings to embeddings of the same dimension comprises:

performing a linear transformation of the plurality of embeddings; and normalizing the plurality of embeddings resulting from the linear transformation.

13. The system as recited in claim 11, wherein transforming the plurality of embeddings to embeddings of the same dimension comprises:

normalizing the plurality of embeddings; and padding with zeros the normalized plurality of embeddings.

14. The system as recited in claim 8, wherein the features are selected from a group comprising user information, item identifier, contextual information, and historical data of interactions of users with an online service.

15. A tangible machine-readable storage medium including instructions that, when executed by a machine, cause the machine to perform operations comprising:

initializing parameters of a neural network and weights for a plurality of embedding sizes for each feature associated with the neural network, wherein, for at least one feature of the features associated with the neural network, two or more candidate embedding sizes are assigned respective weights, wherein an embedding size comprises a size of a vector of a corresponding feature, and a parameter comprises a value within a vector of a corresponding feature;

iteratively optimizing the parameters of the neural network and the weights, each optimization iteration comprising:

training the neural network with current parameters of the neural network to optimize a value of the weights of the candidate embedding sizes; and training the neural network with current values of the weights to optimize the parameters of the neural network, wherein learned embedding weights from the current optimization iteration are used to select embedding sizes that have a highest current value for each feature;

selecting embedding sizes for the features based on the optimized values of the weights; training the neural network based on the selected embedding sizes for the features to obtain an estimator model; and generating a prediction utilizing the estimator model.

16. The tangible machine-readable storage medium as recited in claim 15, wherein selecting embedding sizes further comprises:

setting the embedding sizes of the features based on the optimized values of the weights obtained from the iterative optimization; and transforming the embedding of the features to vectors of a common dimension.

17. The tangible machine-readable storage medium as recited in claim 15, wherein the initializing further comprises:

generating a plurality of embedding for each feature, each embedding associated with a respective weight.

18. The tangible machine-readable storage medium as recited in claim 17, wherein the machine further performs operations comprising:

for each feature:

transforming a plurality of embeddings for the feature to embeddings of a same dimension; and combining the transformed embeddings based on the weights to obtain a formal embedding for the feature, wherein the formal embedding is an input to the neural network.

19. The tangible machine-readable storage medium as recited in claim 18, wherein the machine further performs operations comprising:

wherein transforming the plurality of embeddings to embeddings of the same dimension comprises:

performing a linear transformation of the plurality of embeddings; and normalizing the plurality of embeddings resulting from the linear transformation.

20. The tangible machine-readable storage medium as recited in claim 18, wherein transforming the plurality of embeddings to embeddings of the same dimension comprises:

normalizing the plurality of embeddings; and padding with zeros the normalized plurality of embeddings.

* * * * *